United States Patent [19]

Berestecky

[11] Patent Number: 5,398,168
[45] Date of Patent: Mar. 14, 1995

[54] PROTECTIVE SHIELD

[75] Inventor: Michael M. Berestecky, Mansfield, Ohio

[73] Assignee: Therm-O-Disc, Incorporated, Mansfield, Ohio

[21] Appl. No.: 176,850

[22] Filed: Jan. 3, 1994

[51] Int. Cl.⁶ .............................................. H05K 9/00
[52] U.S. Cl. ................................... 361/816; 361/759; 361/801; 174/35 R
[58] Field of Search .............. 361/816, 740, 759, 801, 361/800, 802; 174/35 R, 261; 439/78, 79

[56] References Cited

U.S. PATENT DOCUMENTS

| | | | |
|---|---|---|---|
| 3,621,197 | 11/1971 | Place | 219/328 |
| 3,626,151 | 12/1971 | Them et al. | 219/328 |
| 3,914,660 | 10/1975 | Stearley | 317/118 |
| 3,914,661 | 10/1975 | Manecke et al. | 317/118 |
| 4,008,419 | 2/1977 | Stearley | 361/334 |
| 4,055,724 | 10/1977 | Manecke et al. | 174/66 |
| 4,543,445 | 9/1985 | Turner | 174/5 R |
| 4,554,616 | 11/1985 | McIntosh | 361/424 |
| 4,588,851 | 5/1986 | Turner | 174/5 R |
| 4,641,223 | 2/1987 | McIntosh | 361/424 |

Primary Examiner—Leo P. Picard
Assistant Examiner—Young Whang
Attorney, Agent, or Firm—Jones, Day, Reavis & Pogue

[57] ABSTRACT

A protective shield for attachment to an electrical control on an electric water heater having a heating element extending into the water heater tank below the control. The shield has an upper section attached to the control and a depending lower section that shields the electrical connections to the heating element. The lower section is hinged to the upper section for upward swinging movement to a raised position providing access to the heating element. Latches on the opposite sides of the shield releasably hold the lower section in its raised position. Attachment of the shield to the control is effected by upwardly opening shield sockets that receive downwardly extending projections on the control and by a shield top end loop received over a lug on the control.

17 Claims, 4 Drawing Sheets

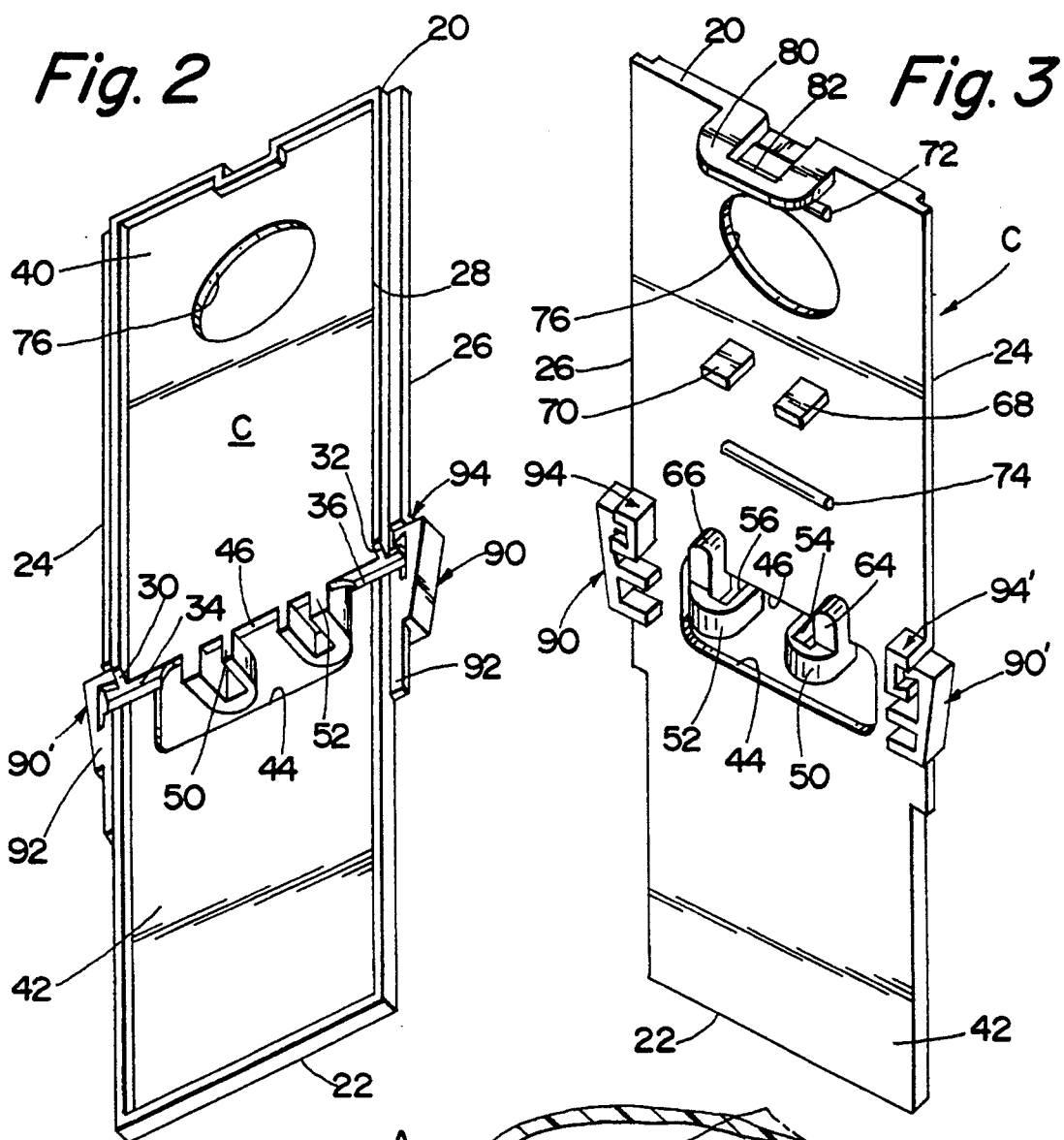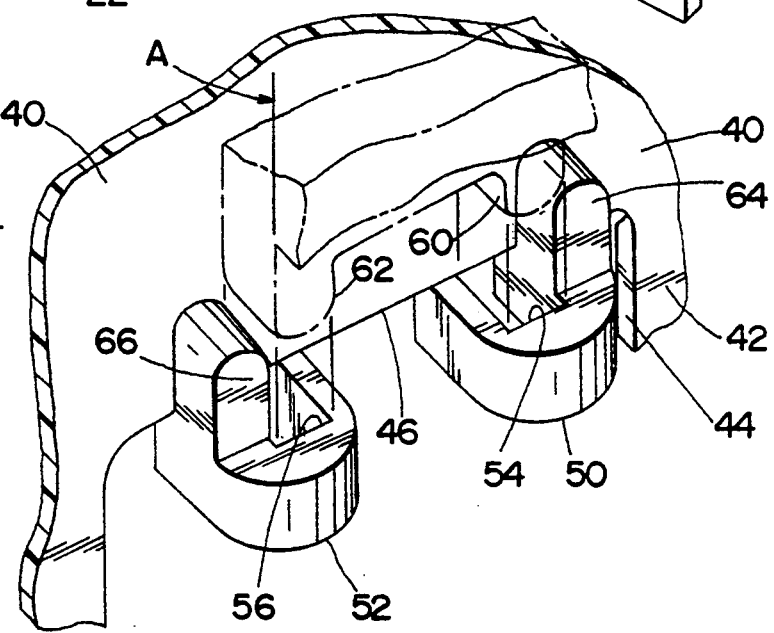

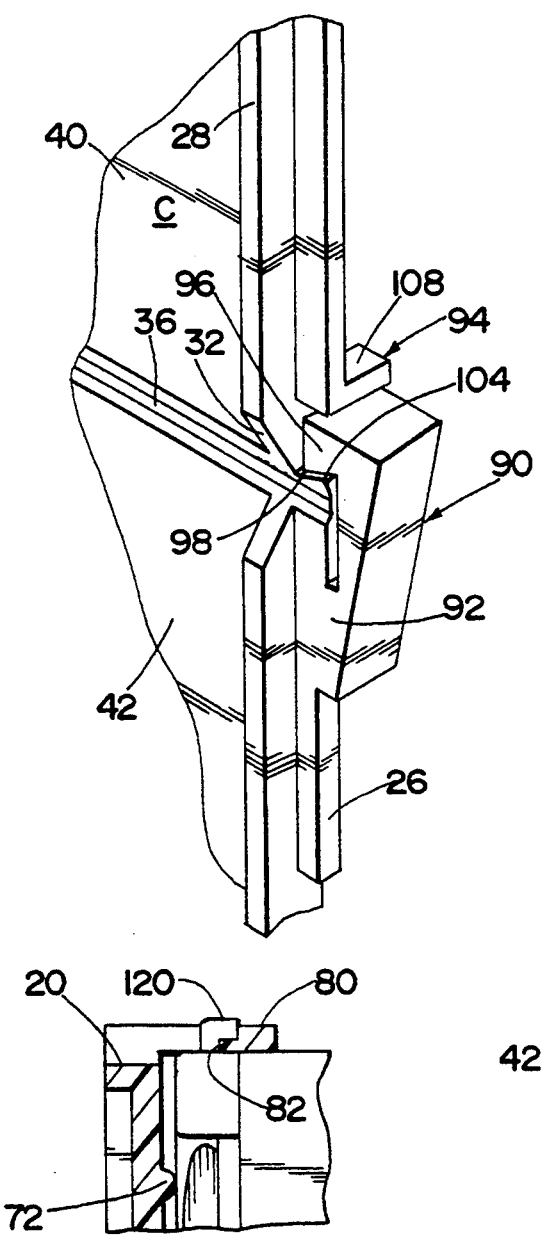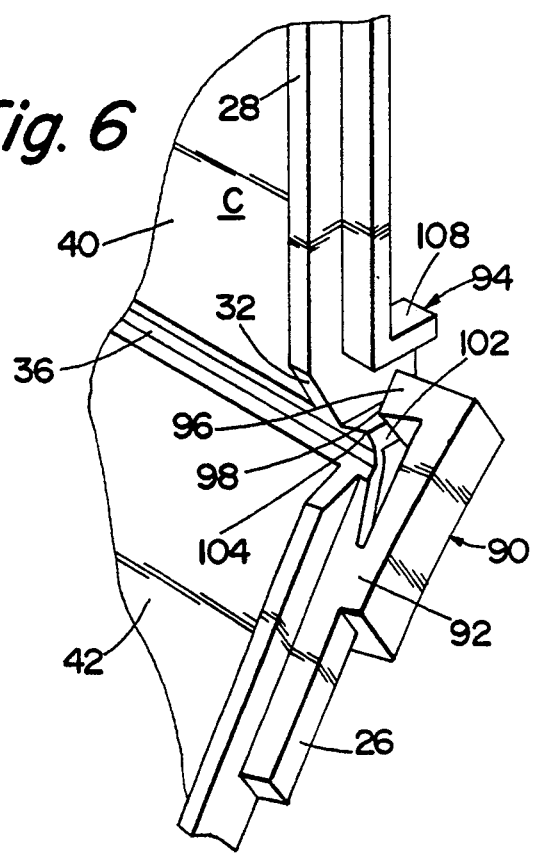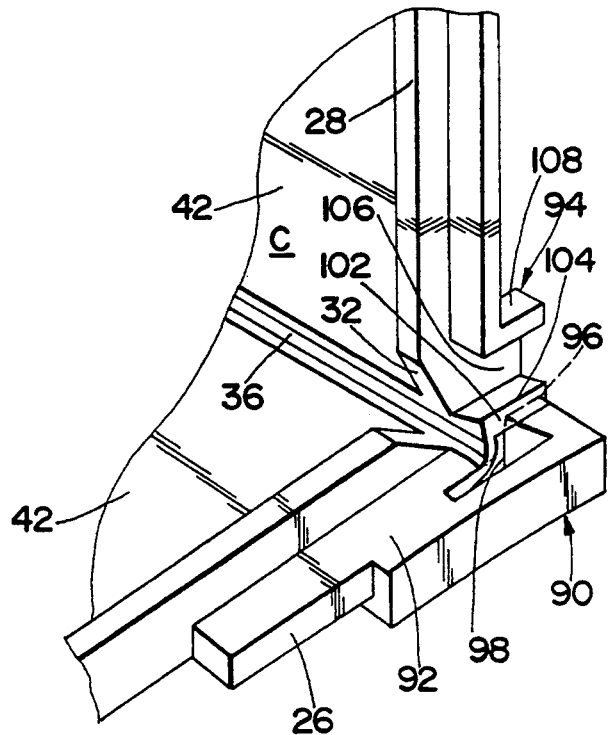

PROTECTIVE SHIELD

BACKGROUND OF THE INVENTION

This application relates to the art of protective shields and, more particularly, to such shields for electrical devices. The invention is particularly applicable for use in shielding electrical connections on an electric water heater and will be described with specific reference thereto. However, it will be appreciated that the invention has broader aspects and can be used in other environments.

Electric water heaters have electrical connections to a control and to a heating element that are covered by a plastic shield for preventing human contact with the electrical connections. Servicing the water heater by replacing the heating element usually requires removal of the entire plastic shield. This exposes all of the electrical connections and may create a hazardous condition if the repair person damages the shield during removal of same so that it cannot be reattached, or if the repair person neglects to reattach the shield. Repeated removal of the shield may also damage the attachment means so that it no longer meets requirements. Therefore, it would be desirable to have such a shield that does not require removal for servicing the heating element and that has a very secure attachment to the control so that it is capable of withstanding a very high pulling force.

SUMMARY OF THE INVENTION

A protective shield of the type described includes top and bottom ends and opposite sides. An integral hinge extends transversely across the shield between its opposite sides at a location intermediate the top and bottom ends. This provides upper and lower sections connected by the hinge for upward swinging movement of the lower section to a raised position that allows servicing of a water heater heating element.

Latch means is provided on the sides of the shield for releasably latching the lower section in its raised position. The latches include latch members integrally attached to the lower section on one side of the hinge and extending past the hinge for cooperation with latch keepers on the upper section on the opposite side of the hinge.

The latches are completely independent of the hinge and serve only to hold the lower section in its raised position. When the lower section extends substantially co-planar with the upper section, the latches perform no function and the lower section simply hangs freely from the upper section.

The latch members bend outwardly and inwardly toward and away from the sides of the shield during movement between latched and unlatched positions, and are designed to resist bending in a direction perpendicular to the plane of the shield.

The upper section has socket members extending rearwardly therefrom adjacent the hinge. The socket members have sockets that open upwardly toward the top end of the shield for receiving downwardly extending projections on a control device for the water heater.

The shield has an access opening therein for providing access to a temperature adjusting knob on the control. The access opening is in the lower section of the shield and extends upwardly across the hinge to define an access opening upper end located just above the hinge. The socket members extend downwardly into the access opening from the opening upper end.

The shield is further attached to the control by a shield loop that extends rearwardly from the top end of the shield for reception over a lug on the water heater control.

Ribs and locators extend rearwardly from the rear surface of the upper section for cooperation with the control device when the shield is mounted thereto.

It is a principal object of the present invention to provide an improved shield for shielding electrical connections on electric water heaters.

It is also an object of the invention to provide such a shield with a hinged lower section having side latches for releasably latching the lower section in a raised position.

It is a further object of the invention to provide such a shield with improved attaching means for attaching the upper section thereof to a water heater control.

BRIEF DESCRIPTION OF THE DRAWING

FIG. 2 is a front perspective illustration of the shield;

FIG. 3 is a rear perspective illustration of the shield;

FIG. 4 is a partial enlarged rear perspective illustration showing socket members on the rear of the shield that receive downwardly extending projections on a control device;

FIG. 5 is a partial perspective illustration showing a latch on a side of the shield for releasably latching a hinged lower section in a raised position;

FIG. 6 is a view similar to FIG. 5 and showing the latch in an intermediate position during movement of the lower hinged shield section to its raised heater element replacement position;

FIG. 7 is a view similar to FIGS. 5 and 6, and showing the position of the side latches when the hinged lower section is latched in its raised position;

FIG. 8 is a partial side elevational view showing a rearwardly extending loop at the top end of the shield received over an upwardly projecting lug on a water heater control.

DESCRIPTION OF A PREFERRED EMBODIMENT

Figure 1:
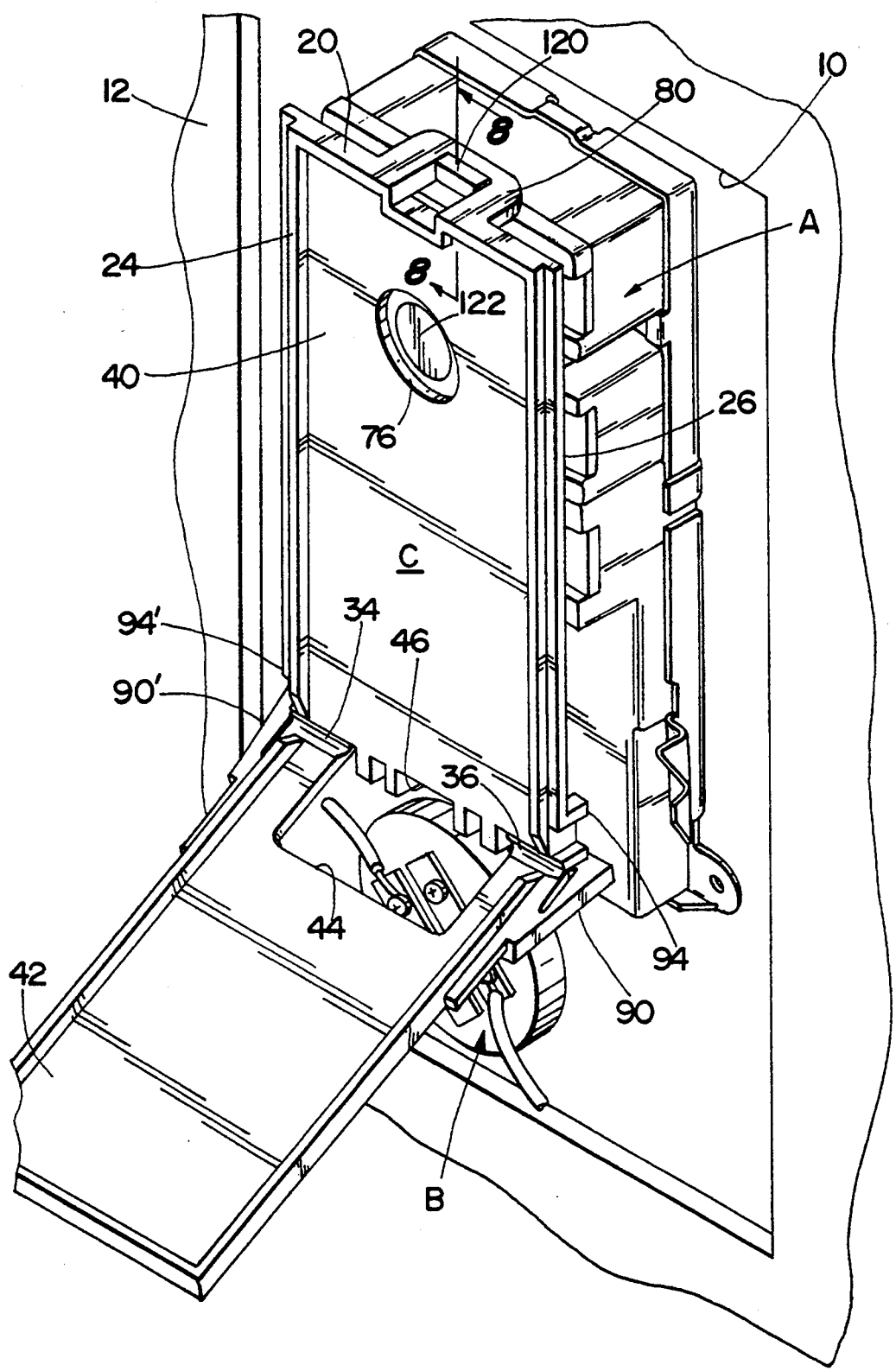
FIG. 1 is a perspective illustration showing the shield of the present application attached to an electrical control on an electric water heater.

Referring now to the drawing, wherein the showings are for purposes of illustrating a preferred embodiment of the invention only and not for purposes of limiting same, FIG. 1 shows an opening 10 in a housing 12 of an electric water heater. An electrical control device A is mounted on the water heater tank 14 within opening 10. An electric heating element B extends into the tank below control device A. A protective shield C constructed in accordance with the present application is mounted on control device A for shielding the electrical connections thereon and on heating element B.

With reference to FIGS. 2 and 3, shield C is molded in one-piece of dielectric synthetic plastic material. Shield C has top and bottom ends 20, 22 and opposite sides 24, 26. A raised bead on the front surface of shield C extends around the periphery thereof for enhancing bending resistance.

Bead 28 is oppositely notched as indicated at 30, 32 and the thickness of shield C is reduced along horizontal lines 34, 36 in alignment with notches 30, 312. Notches 30, 32 and the lines of reduced thickness 34, 36 define a horizontal hinge extending transversely across shield C between opposite sides 24, 26 thereof at a location spaced intermediate top and bottom ends 20, 22 thereof. The hinge separates shield C into upper and lower shield sections 40, 42. The length of upper section 40 is just slightly greater than the length of lower section 42.

An enlarged generally rectangular opening 44 is provided in lower section 42 for providing access to a temperature adjustment knob on the control device. Access opening 44 extends across the hinge line defined by lines of reduced thickness 34, 36 and has an opening upper end 46 located just above the hinge line.

Generally U-shaped socket members 50, 52 project downwardly into access opening 44 from opening upper end 46. Socket members 50, 52 open outwardly toward the front face of shield C to facilitate molding thereof.

Socket members 50, 52 have sockets 54, 56 therein that open upwardly toward shield top end 20 for receiving downwardly extending projections 60, 62 on control device A. Reinforcing ribs 64, 66 extend rearwardly from shield C and are integrally formed with socket members 50, 52 for reinforcing same.

Locating projections 68, 70 extend rearwardly from upper section 40 intermediate top end 20 and the hinge line between upper and lower sections 40, 42. Horizontal ribs 72, 74 project rearwardly from upper section C for engaging the front surface of a control device on which shield C is mounted. A hole 76 in upper section 40 provides access to a reset button the control device.

A loop member 80 projects rearwardly from shield C at the top end 20 thereof to provide an opening 82 for receiving an upwardly projecting lug on the control device.

Lower section 42 is swingable about the hinge to a raised position for providing access to heating element B in FIG. 1. Latch means is provided for releasably latching lower section 42 in its raised position so that a service person may work on the heating element without interference from lower section 42 while shield C remains mounted on control device A.

Latch means is provided on the opposite sides of shield C for releasably latching lower section 42 in its raised position. With reference to FIGS. 5–7, an elongated latch member 90 is integrally attached at its lower end 92 to side 26 of lower section 42 on the lower side of hinge 36. Latch member 90 extends upwardly completely past hinge 36 for cooperation with a latch keeper 94 on upper shield section 40 on the opposite side of hinge 36.

Latch member 90 has a transverse inwardly extending latch projection 96. Latch projection 96 has a flat outer end and an inclined underside that intersect one another at an edge 98 that extends perpendicular to the plane of shield C when upper and lower sections 40, 42 are substantially co-planar. Latch projection 94 includes a horizontal portion 102 having an edge 104 thereon. Vertical and horizontal upper walls 106, 108 are connected with lower wall 102 for stiffening same against bending.

The thickness of latch member 90 perpendicular to the plane of shield C is substantially greater than the thickness of shield C so that latch member 90 is highly resistant to bending in directions perpendicular to the plane of shield C. Latch member 90 has a reduced thickness transversely of shield C, particularly adjacent the portion thereof connected with the side of lower section at 92. This allows latch member 90 to bend outwardly and inwardly toward and away from the side of shield C.

With upper and lower sections 40, 42 extending substantially co-planar as shown in FIG. 5, the latch member and the latch keeper are completely spaced from one another so that lower section 42 simply hangs down from upper section 40 and the latch means does not hold lower section 42 in that position.

When lower section 42 is raised about the hinge, there is eventually contact between the inclined underside of latch projection 96 and the correspondingly inclined surface of lower latch keeper wall 102. This engagement between such inclined surfaces causes them to act as cam surfaces and bends latch member 90 outwardly away from the side of shield C until edges 98, 104 engage one another. Continued upward swinging movement of lower section 42 causes edge 98 on latch projection 96 to ride along edge 104 on the latch keeper to further bend latch member 90 outwardly. Lower section 42 eventually reaches a raised position in which latch projection 96 snaps beneath horizontal latch keeper wall 102 as shown in FIG. 6. This releasably holds lower section 42 in a position slightly inclined downwardly from the horizontal as generally shown in FIG. 1. This provides ready access to heating element B by a repair person.

A downward swinging force on lower section 42 causes latch member 90 to twist and cam outwardly until it snaps above lower latch keeper wall 102 so that the latch means returns to the position shown in FIG. 5. Parts on the opposite side of the shield have been given the same numerals with a prime.

Figure 9:
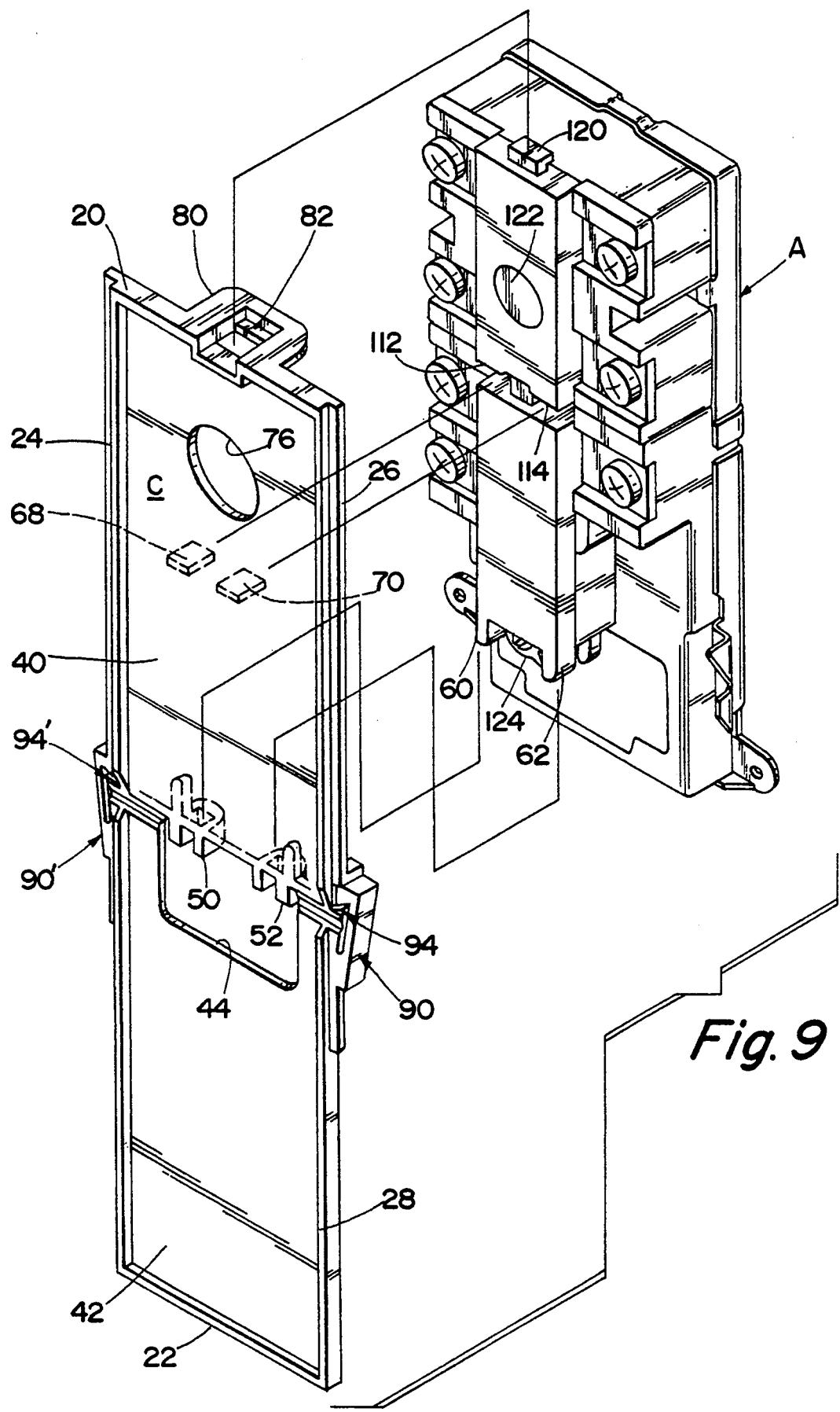
FIG. 9 is a perspective illustration showing how the shield is attached to the electrical control.

Assembly of the shield to a control device is generally illustrated in FIG. 9. Shield C is positioned with socket members 50, 52 aligned below projections 60, 62 on control A. The top end of shield C is also inclined outwardly away from control A and upward movement of shield C causes downwardly extending projections 60, 62 on control device A to enter the sockets in socket members 50, 52.

The locating projections 68, 70 extending rearwardly from shield C then enter slots 112, 114 in the front face of control device A. Shield C is then pushed toward control device A, and pushing force applied to the top portion of shield C moves loop 80 over lug 120 until loop 80 snaps behind such lug with lug 120 received in loop opening 82.

Control device A has a reset button 122 that is accessible through hole 76 in shield C, and a temperature adjusting knob 124 on control device A is accessible through access opening 44 in shield C.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A protective shield for an electrical device, said shield having top and bottom ends and opposite sides, an integral hinge in said shield extending thereacross between said opposite sides intermediate said top and bottom ends, said hinge dividing said shield into upper and lower sections, said lower section being swingable about said hinge to a raised position extending transversely of said upper section, and a cooperating latch member and latch keeper between said upper and lower sections along at least one of said sides for releasably latching said lower section in said raised position, said latch member being on one of said sections and extending from a position on one side of said hinge on said one section to a position on the opposite side of said hinge on the other of said sections, and said latch keeper being on said other section on said opposite side of said hinge.

2. A protective shield for an electrical device, said shield having top and bottom ends and opposite sides, an integral hinge in said shield extending thereacross between said opposite sides intermediate said top and bottom ends, said hinge dividing said shield into upper and lower sections, said lower section being swingable about said hinge to a raised position extending transversely of said upper section, cooperating latch means between said upper and lower sections along at least one of said sides for releasably latching said lower section in said raised position, and attaching means extending rearwardly from said upper section for attaching said shield to an electrical device.

3. The shield of claim 2 wherein said attaching means includes a socket member located adjacent said hinge and having a socket that opens upwardly toward said top end of said shield.

4. The shield of claim 3 including a control adjustment access opening in said lower section adjacent said hinge, said access opening having an upper end located above said hinge on said upper section, and said socket member extending downwardly into said access opening from said upper end thereof.

5. The shield of claim 3 wherein said attaching means further includes a loop member extending rearwardly of said shield adjacent said top end thereof for cooperation with a lug on a control device.

6. A protective shield for an electrical device, said shield having top and bottom ends and opposite sides, an integral hinge in said shield extending thereacross between said opposite sides intermediate said top and bottom ends, said hinge dividing said shield into upper and lower sections, said lower section being swingable about said hinge to a raised position extending transversely of said upper section, cooperating latch means between said upper and lower sections along at least one of said sides for releasably latching said lower section in said raised position, and a control adjustment access opening in said lower section, said opening extending across said hinge and having an upper opening end located on said upper section.

7. A protective shield for an electrical device, said shield having top and bottom ends and opposite sides, an integral hinge in said shield extending thereacross between said opposite sides intermediate said top and bottom ends, said hinge dividing said shield into upper and lower sections, said lower section being swingable about said hinge to a raised position extending transversely of said upper section, and cooperating latch means between said upper and lower sections along at least one of said sides for releasably latching said lower section in said raised position, said latch means including a latch member that bends outwardly and inwardly relative to said one side during movement thereof between latched and unlatched positions.

8. A protective shield for an electrical device, said shield having top and bottom ends and opposite sides, an integral hinge in said shield extending thereacross between said opposite sides intermediate said top and bottom ends, said hinge dividing said shield into upper and lower sections, said lower section being swingable about said hinge to a raised position extending transversely of said upper section, and cooperating latch means between said upper and lower sections along at least one of said sides for releasably latching said lower section in said raised position, said latch means being completely independent of said hinge and said latch means does not integrally connect said upper and lower sections.

9. A protective shield for an electrical device, said shield having top and bottom ends and opposite sides, a hinge extending transversely across said shield between said sides intermediate said top and bottom ends to define upper and lower sections, said lower section being swingable upwardly about said hinge, and attaching socket members extending rearwardly from said upper section closely adjacent said hinge for attaching said shield to an electrical device, said socket members having sockets opening upwardly toward said top end.

10. A protective shield for an electrical device, said shield having top and bottom ends and opposite sides, a hinge extending transversely across said shield between said sides intermediate said top and bottom ends to define upper and lower sections, said lower section being swingable upwardly about said hinge, attaching means extending rearwardly from said upper section closely adjacent said hinge for attaching said shield to an electrical device, and said attaching means being substantially aligned with said hinge.

11. A protective shield for an electrical device, said shield having top and bottom ends and opposite sides, a hinge extending transversely across said shield between said sides intermediate said top and bottom ends to define upper and lower sections, said lower section being swingable upwardly about said hinge, attaching means extending rearwardly from said upper section closely adjacent said hinge for attaching said shield to an electrical device, and latches on said sides for releasably latching said lower section in a raised position.

12. The shield of claim 11 wherein said latches include latch members attached to one of said sections on one side of said hinge and extending past said hinge for cooperation with latch keepers on the other of said sections on the opposite side of said hinge.

13. A protective shield for an electrical device, said shield having top and bottom ends and opposite sides, a hinge extending transversely across said shield between said sides intermediate said top and bottom ends to define upper and lower sections, said lower section being swingable upwardly about said hinge, attaching means extending rearwardly from said upper section closely adjacent said hinge for attaching said shield to an electrical device, and spacer means projecting rearwardly from said upper section intermediate said hinge and said top end for spacing said upper section from an electrical device.

14. A protective shield for an electrical device, said shield having top and bottom ends and opposite sides, a hinge extending transversely across said shield between said sides intermediate said top and bottom ends to define upper and lower sections, said lower section being swingable upwardly about said hinge, attaching means extending rearwardly from said upper section closely adjacent said hinge for attaching said shield to an electrical device, and a loop extending rearwardly from said top end for attachment to a lug on a control device.

15. A protective shield for an electrical device, said shield having top and bottom ends and opposite sides, a hinge extending transversely across said shield between said sides intermediate said top and bottom ends to define upper and lower sections, said lower section being swingable upwardly about said hinge, attaching means extending rearwardly from said upper section closely adjacent said hinge for attaching said shield to an electrical device, and a control adjustment access opening in said lower section and extending across said hinge to an opening upper end located on said upper section just above said hinge, and said attaching means extending downwardly from said opening upper end into said opening.

16. A protective shield for an electrical control, said shield having top and bottom ends and opposite sides, an access opening in said shield intermediate said top and bottom ends for accessing an adjustment on the control device, said opening having an opening upper end, at least one socket member extending rearwardly from said shield adjacent said opening upper end, said socket member having a socket therein that opens inwardly toward said top end of said shield for receiving a downwardly extending projection on the control device, and said socket member projecting downwardly into said opening from said opening upper end.

17. The shield of claim 16 wherein said socket member is substantially U-shaped with the ends of the U located in said access opening to provide an entry to the interior of the U from the front of said shield through said access opening.

* * * * *